United States Patent
Kneuper et al.

(10) Patent No.: US 8,765,009 B2
(45) Date of Patent: Jul. 1, 2014

(54) PROCESS FOR PREPARING NITRIC ACID WITH A CONCENTRATION IN THE RANGE FROM 50 TO 77.8% BY WEIGHT

(75) Inventors: Heinz-Josef Kneuper, Niederkirchen (DE); Jan-Martin Loening, Freinsheim (DE); Stephanie Mollner, Mannheim (DE); Joerg Torsten Nickel, Karlsruhe (DE)

(73) Assignee: BASF SE, Ludwigshafen (SE)

( * ) Notice: Subject to any disclaimer, the term of this patent is extended or adjusted under 35 U.S.C. 154(b) by 1211 days.

(21) Appl. No.: 12/601,534

(22) PCT Filed: Jul. 8, 2008

(86) PCT No.: PCT/EP2008/058816
§ 371 (c)(1),
(2), (4) Date: Nov. 24, 2009

(87) PCT Pub. No.: WO2009/007355
PCT Pub. Date: Jan. 15, 2009

(65) Prior Publication Data
US 2010/0181530 A1    Jul. 22, 2010

(30) Foreign Application Priority Data
Jul. 9, 2007    (EP) .................................... 07112044

(51) Int. Cl.
*C09K 3/00*    (2006.01)
(52) U.S. Cl.
USPC .................................................. 252/182.34
(58) Field of Classification Search
USPC ............................ 423/390.1, 392, 393, 394.2
See application file for complete search history.

(56) References Cited

U.S. PATENT DOCUMENTS

| | | |
|---|---|---|
| 4,219,536 A | 8/1980 | Hoenke |
| 2003/0143148 A1 | 7/2003 | Maurer |

FOREIGN PATENT DOCUMENTS

WO    01 68520    9/2001

OTHER PUBLICATIONS

Thomas H. Chilton, "The Manufacture of Nitric Acid by the Oxidation of Ammonia" American Institute of Chemical Engineers, 1960, pp. 1-21.*
Guy B. Taylor et al., "Manufacture of Nitric Acid by the Oxidation of Ammonia" Industrial and Engineering Chemistry, vol. 23, No. 8, 1931, pp. 860-865.*
Inorganic chemistry industry, Feb. 1998.*
Maurer et al, enhanced plant design for the production for zeotropic nitric aicd, 2000.*
Michael Thiemann, et al., "Nitric Acid, Nitrous Acid, and Nitrogen Oxides", 2005 Wiley-VCH Verlag GmbH & Co. KGaA, Weinheim, pp. 1-49.

* cited by examiner

Primary Examiner — Melvin C Mayes
Assistant Examiner — Stefanie Cohen
(74) Attorney, Agent, or Firm — Oblon, Spivak, McClelland, Maier & Neustadt, L.L.P.

(57) ABSTRACT

A process for preparing nitric acid by: catalytically oxidizing ammonia, to obtain a gas mixture containing NO and $O_2$; cooling and condensing the gas mixture, thereby further oxidizing NO with $O_2$, to obtain a gas stream containing $NO_2/N_2O_4$ and an aqueous solution containing nitric acid; and countercurrently absorbing the $NO_2/N_2O_4$ from the gas stream in an absorber with process water ($H_2O$), to obtain nitric acid and an $NO_x$-containing absorber offgas, wherein the water content of the nitric acid is regulated to a concentration in the range from 50 to 77.8% by weight and the $NO_x$ content of the absorber offgas to a concentration in the range from 20 to 500 ppm, by continuously measuring the water content of the process air supplied to the catalytic gas phase oxidation and, as a function of this, adjusting the amount of process water (Q-$H_2O$) fed to the absorber.

11 Claims, 3 Drawing Sheets

PROCESS FOR PREPARING NITRIC ACID WITH A CONCENTRATION IN THE RANGE FROM 50 TO 77.8% BY WEIGHT

The invention relates to a process for preparing nitric acid with a concentration in the range from 50 to 77.8% by weight.

Nitric acid is prepared on the industrial scale exclusively by catalytic gas phase oxidation of ammonia, which was developed by Ostwald at the turn of the last century. In this process, gaseous ammonia is combusted with air over catalyst meshes, generally composed of platinum or platinum-rhodium alloys. The quantitative ratio of ammonia and air is adjusted such that a stoichiometric excess of oxygen relative to ammonia is present.

The combustion of ammonia affords a gas mixture which comprises nitrogen monoxide, abbreviated hereinafter to NO, and additionally excess oxygen, abbreviated hereinafter to $O_2$. The reaction mixture which comprises NO and $O_2$ from the catalytic gas phase oxidation of ammonia is cooled, in the course of which partial condensation takes place and NO is oxidized further with the excess $O_2$ in an equilibrium reaction to give nitrogen dioxide, referred to hereinafter as $NO_2$, which dimerizes to give dinitrogen tetroxide, referred to hereinafter as $N_2O_4$. This affords an aqueous nitric acid solution and a gas stream comprising $NO_2/N_2O_4$, the gas stream generally being greater by a factor of from 5 to 6 than the stream of the aqueous solution. The gas stream is fed to a countercurrent absorption with water, in the course of which $NO_2$, in the form of $N_2O_4$, the reactive species thereof, reacts to form nitric acid. This reaction is exothermic and is promoted by high pressures and low temperatures.

Most industrial plants for preparing nitric acid work by the two-pressure process (cf. Ullmann's Encyclopedia of Industrial Chemistry, Release 2006, $7^{th}$ Edition, "Nitric Acid, Nitrous Acid and Nitrogen Oxides"), in which ammonia is combusted with air at relatively low pressure, frequently of about 5 bar, since the yield of this reaction decreases with rising pressure. The countercurrent absorption of $NO_2/N_2O_4$ with process water is carried out at elevated pressure compared to the combustion of ammonia, frequently within the range from about 4 to 20 bar, generally in columns with cooled sieve trays.

In the above process steps, water is formed or introduced, such that the achievable maximum concentration of the nitric acid is limited.

For one metric tonne of 68% by weight nitric acid, the water originates from the following sources:
54 kg, corresponding to 17%, from process air at 25° C. and 80% air humidity,
205 kg, corresponding to 64%, water of reaction and
61 kg, corresponding to 19%, process water which has been used in the absorber.

Recently, the demand for nitric acid of moderate concentration, in the region of the azeotropic composition of approx. 68% by weight of nitric acid in water, for the preparation of industrial scale products, especially the diisocyanates toluene diisocyanate (TDI) and methylene diphenyldiisocyanate (MDI) for the preparation of polyurethanes, has risen. Nitric acid with a concentration in the range of the azeotropic composition is referred to as azeotropic nitric acid.

In the water balance addressed above, in the process for preparing nitric acid by ammonia oxidation, the input of water is determined stoichiometrically via the water of reaction and thus cannot be influenced. The stoichiometric limiting concentration is 77.8% by weight of nitric acid. The achievable limiting concentration, taking account of the burner efficiency and the additional input of water through secondary reactions (combustion to nitrogen and dinitrogen monoxide), falls to about 76.6%.

The input of water via the process water can be controlled, but, for a stable operation of the absorption column and in order to minimize the losses of nitrogen oxides, referred to hereinafter as $NO_R$, via the absorber offgas, for economic and environmental reasons, frequently in the range from about 20 to 500 ppm, a certain minimum input of process water is required.

Nitrogen oxides, $NO_R$, are, as usual, understood to mean mixtures comprising NO, $NO_2$, $N_2O_4$ and additionally further N—O compounds with different stoichiometry.

The input of water into the process via the steam content of the process air depends on the climatic conditions at the plant site. The steam content of the process air can be reduced by predrying.

Such a process is proposed in WO 01/68520. According to this, the process air is predried by cooling before being fed to the nitric acid plant, water vapor being condensed out by lowering the temperature beyond the dew point, and then the predried process air is heated up again and sent to the ammonia oxidation. A disadvantage here is that the process is complicated, especially in that additional apparatus is required for the cooling and reheating of the process air, with correspondingly increased capital and operating costs.

The problem addressed by the invention was accordingly that of establishing a process for preparing nitric acid with a concentration in the region of the azeotropic composition with water, of from about 50 to 77.8% by weight, which can be performed in a simple manner in industry and does not have the disadvantages detailed above.

Figure 1:
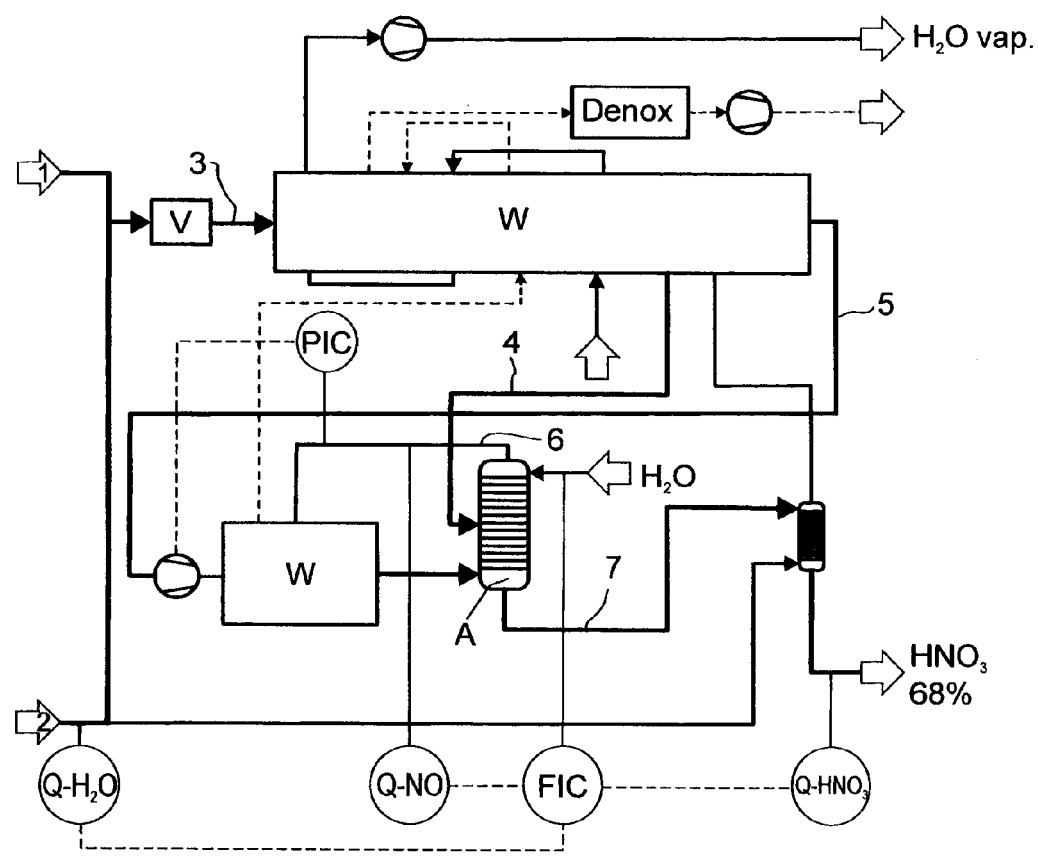
FIG. 1: A schematic illustration of a preferred inventive plant for preparing azeotropic nitric acid.

The solution consists in a process for preparing nitric acid with a concentration in the range from 50 to 77.8% by weight by catalytic gas phase oxidation of ammonia with a superstoichiometric proportion of process air to obtain a gas mixture comprising NO and $O_2$, cooling/condensation of the gas mixture comprising NO and $O_2$, in the course of which NO is oxidized further by $O_2$ to $NO_2/N_2O_4$ to obtain an aqueous solution comprising nitric acid and a gas stream comprising $NO_2/N_2O_4$ and countercurrent absorption of the $NO_2/N_2O_4$ from the gas stream comprising $NO_2/N_2O_4$ in process water in an absorber to obtain the nitric acid with a concentration in the range from 50 to 77.8% by weight and an $NO_x$-comprising absorber offgas, wherein the water content of the nitric acid is regulated to a concentration in the range from 50 to 77.8% by weight and the $NO_x$ content of the absorber offgas to a concentration in the range from 20 to 500 ppm, by continuously measuring the water content of the process air supplied to the catalytic gas phase oxidation and, as a function of this, adjusting the amount of process water fed to the absorber.

It has thus been found that it is possible in a simple manner to regulate the process parameter of the water content of nitric acid to a value in the concentration range of from 50 to 77.8% by weight and the process parameter of the $NO_x$ content of the absorber offgas to a concentration in the range from 150 to 500 ppm, by continuously measuring, as a control parameter, the water content of the process air fed to the catalytic gas phase oxidation and, as a function thereof, as a regulating parameter, adjusting the amount of process water fed to the absorber.

In this context, the regulating parameter, the amount of process water, is adjusted such that the water balance to achieve a set nitric acid target concentration and simultaneously a set offgas concentration of the absorber offgas with regard to $NO_x$ are maintained in each case within the ranges specified above.

The water balance to achieve a set nitric acid target concentration arises from the following equation:
the amount of process water fed to the absorber corresponds to the sum of the amount of nitric acid product multiplied by the water concentration in the product, the water required for nitric acid formation and the amount of $NO_x$ in the absorber offgas, multiplied by an absorber-specific factor, from which the water of reaction of the catalytic ammonia combustion and the air humidity introduced via the amount of process air are subtracted.

To date, such regulation concepts are unknown; the process water feed to the absorber is regulated without taking account of the water content of the process air fed to the process, exclusively using the process parameters before the concentration of the nitric acid product and $NO_x$ values of the absorber offgas.

The process according to the invention provides nitric acid with a concentration within the region of the composition of the azeotrope with water, from 50 to 77.8% by weight. The concentration of the nitric acid which is prepared by the process according to the invention is preferably in the range from 60 to 77.8% by weight, more preferably in the range from 68 to 70% by weight.

The $NO_x$ content of the absorber offgas is regulated to from 20 to 500 ppm, especially to a concentration in the range from 150 to 400 ppm.

Preference is given to a two-stage process regime with a lower pressure for the catalytic gas phase oxidation of ammonia compared to the pressure for the countercurrent absorption of the $NO_2/N_2O_4$ in the process water; preference is given to an operating mode with an absorber pressure between 4 and 20 bar, more preferably between 7 and 14 bar.

The absorber used is preferably a tray column in which the process water is introduced at the uppermost tray and is conducted in countercurrent to the gas mixture comprising $NO_2/N_2O_4$, the reaction to give nitric acid taking place under pressure. Advantageously, the process water, in addition to the introduction to the uppermost tray of the absorber, can also be introduced to one or more further trays, which achieves a shortened reaction time between a process change and the readjustment of the regulating parameter, i.e. the amount of process water.

In a further preferred process variant, the absorber pressure can be kept constant at a maximum possible value by virtue of active regulation of the compressor which is arranged upstream of the absorber, by virtue of the compressor being selected such that, even in the case of variations in the volume flow and in the upstream pressure of the gas stream comprising $NO_2/N_2O_4$, it always ensures a constant end pressure.

The invention will be illustrated below in detail with reference to a figure and to working examples.

FIG. 1 shows the schematic illustration of a preferred inventive plant for preparing azeotropic nitric acid, with supply of ammonia, stream 1, and process air, stream 2, to a catalytic combustion unit V to obtain a gas mixture 3 comprising NO and $O_2$, which is cooled in a heat exchanger W and partly condensed to obtain an aqueous solution 4 comprising nitric acid and a gas stream 5 comprising $NO_2/N_2O_4$. The aqueous solution 4 and the gas stream 5 comprising $NO_2/N_2O_4$, the latter after passing through a heat exchanger W, are fed to an absorber, to which process water $H_2O$ is introduced in countercurrent, and $NO_2/N_2O_4$ reacts in the absorber to give nitric acid, and azeotropic nitric acid, stream 7, is drawn off from the bottom of the absorber, and absorber offgas 6 comprising $NO_x$ at the top of the absorber. The amount of process water Q-$H_2O$ introduced to the absorber A (regulating parameter) is regulated according to the water content of the process air 2 such that the process parameters of the water content of the product, the nitric acid obtained in the plant, Q-$HNO_3$, and the $NO_x$ content of the absorber offgas, Q-$NO_x$, are each regulated within the set range. The absorber offgas 6 is heated by passing it through a first heat exchanger W in which it cools the gas stream 5 comprising $NO_2/N_2O_4$, which is passed to the absorber A, and then, in a further heat exchanger W, by heat exchange with the gas mixture 3 of the catalytic combustion of ammonia. The $NO_x$ present in the absorber offgas thus preheated is then combusted completely to give nitrogen and water in a customary manner, i.e. in a catalytic reactor typically referred to as denox with addition of ammonia.

In FIG. 1, PIC denotes a pressure indicator control and FIC a flow indicator control.

Figure 2:
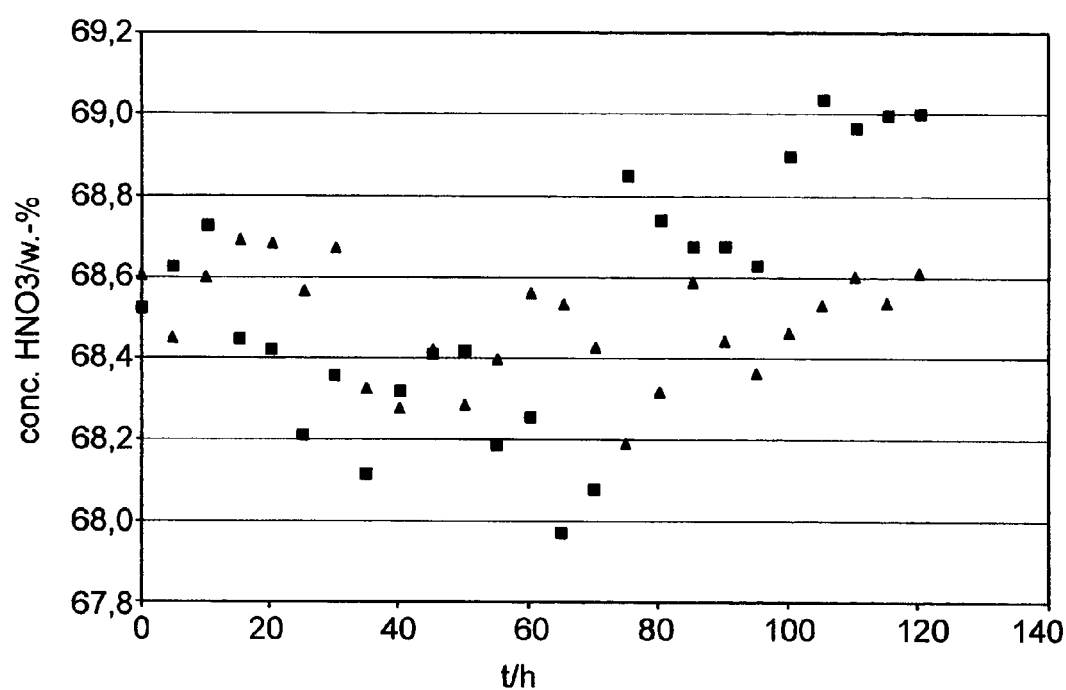
FIG. 2: The variability of the resulting nitric acid in % by weight, conc. $HNO_3$/w.-%, plotted against time in hours, t/h, measured in a nitric acid plant according to the schematic illustration in FIG. 1 with inventive regulation (triangles) and without inventive regulation (squares).

In a nitric acid plant corresponding to the schematic illustration in FIG. 1, operating tests were carried out under different atmospheric conditions, specifically at a variation between air temperature at 25° C. and 84% air humidity, and air temperature 16° C. and 62% air humidity. The concentration of the resulting nitric acid in % by weight, conc. $HNO_3$/w.-%, and the $NO_x$ concentration in ppm, conc. NOx/ppm, in the absorber offgas were each measured with and without inventive regulation, and the results are plotted in the diagrams shown in FIG. 2 and FIG. 3 against time in hours, t/h. FIG. 2 shows that the variability of the nitric acid concentration is narrower with inventive regulation, shown by triangles, compared to the variability without the inventive regulation, shown by squares.

Figure 3:
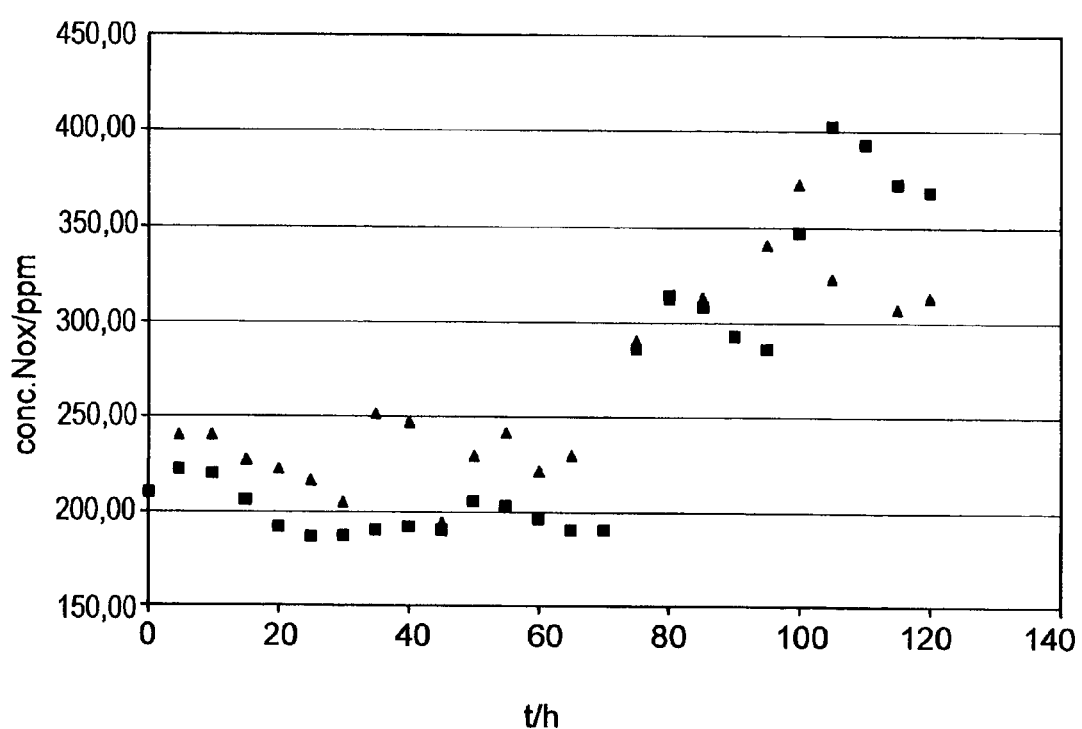
FIG. 3: The variability of the resulting $NO_x$ concentration in ppm, conc. NOx/ppm, in the absorber offgas plotted against time in hours, t/h, measured in a nitric acid plant according to the schematic illustration in FIG. 1 with inventive regulation (triangles) and without inventive regulation (squares).

The same applies to the variability of the $NO_x$ concentration in the absorber offgas, as is evident from FIG. 3, in which the measured $NO_x$ concentrations for a process with inventive regulation are shown by triangles, and the $NO_x$ concentrations for the same process without regulation by squares.

The invention claimed is:
1. A process for preparing nitric acid in a concentration of from 50 to 77.8% by weight, the process comprising:
(I) catalytically oxidizing ammonia in the gas phase with a superstoichiometric proportion of process air, to obtain a gas mixture comprising NO and $O_2$;
(II) cooling and condensing the gas mixture, thereby oxidizing NO with $O_2$ in the gas mixture, to obtain a gas stream comprising $NO_2/N_2O_4$ and an aqueous solution comprising nitric acid; and

(III) countercurrently absorbing the $NO_2/N_2O_4$ from the gas stream in an absorber with process water ($H_2O$), to obtain the nitric acid in a concentration of from 50 to 77.8% by weight and an $NO_x$-comprising absorber offgas, wherein the water content of the process air is continuously measured and, as a function thereof, the amount of process water, (Q-$H_2O$), fed to the absorber is adjusted, such that the concentration of the nitric acid is from 50 to 77.8% and the $NO_x$ content of the $NO_x$-comprising absorber offgas is from 20 to 500 ppm.

2. The process of claim 1, wherein the concentration of the nitric acid is in a range from 60 to 77.8% by weight.

3. The process of claim 2, wherein the concentration of the nitric acid is in a range from 68 to 70% by weight.

4. The process of claim 1, wherein the $NO_x$ content of the absorber offgas is from 150 to 400 ppm.

5. The process of claim 1, wherein the absorber is operated at a pressure of from 4 to 20 bar.

6. The process of claim 5, wherein the absorber is operated at a pressure of from 7 to 14 bar.

7. The process of claim 1, wherein the absorber is a tray column and the process water ($H_2O$) is introduced at an uppermost tray of the absorber column and a further tray of the absorber column.

8. The process of claim 1, wherein a compressor is arranged in upstream from the absorber, and the compressor, in variations of the volume flow and the upstream pressure of the gas stream, maintains a constant end pressure.

9. The process of claim 1, wherein the concentration of the nitric acid is in a range from 68 to 77.8% by weight.

10. The process of claim 9, wherein the $NO_x$ content of the absorber offgas is from 150 to 400 ppm.

11. The process of claim 10, wherein the concentration of the nitric acid is in a range from 68 to 70% by weight.

* * * * *